Patented Jan. 6, 1942

2,268,955

UNITED STATES PATENT OFFICE 2,268,955

BACTERIAL PRODUCT AND BACTERIA STRAIN AND PROCESS OF PRODUCING THE SAME

Rolf Meier, Basel, Switzerland, assignor, by mesne assignments, to Ciba Pharmaceutical Products, Incorporated, Summit, N. J., a corporation of New Jersey No Drawing. Application May 3, 1938, Serial No. 205,809. In Switzerland May 19, 1937

8 Claims. (Cl. 167—78)

The known nutrient media consist of mixtures of, for example, agar-agar, gelatine, boiled serum, heat-treated organs or extracts of organs or the like. Such nutrient media contain, therefore, from the first, substances which are foreign to the body or substances belonging to the body but becoming converted into foreign substances.

This invention relates to a new kind of bacterial product or bacteria strains which are obtained by cultivating bacteria on plasma in a medium not foreign to the body, and if desired removing the bacteria in known manner from the separable nutrient liquid.

Bacteria or bacterial products having special effects are obtained in this manner when there is added to the nutrient medium a sterile organ or an extract of a sterile organ.

The plasma or serum required in the nutrient medium may be obtained, for example, by the sterile removal of blood from animals or by sterilizing such blood subsequently by filtration or similar means. The plasma may be used both in liquid and in solid form. In the latter form it is easily obtained, for example, by the addition of substances favouring coagulation and belonging to the body, for example thrombin or animal native preparations containing such. The use of plasma shows a considerable technical advantage over the use of serum, in that it provides bacteria, which do not grow or grow only poorly in a liquid medium, with a more favorable, i. e. solid, medium on which to grow.

The liquids obtained after the incubation possess specific chemotactic properties, among others that of collecting white blood corpuscles. This is of importance for the treatment of infection, since by their use there is an enrichment of leucocytes at an early stage and therewith a protection against further development of the infection. The change of hydrogen-ion concentration in the nutrient media which, as is known, is brought about by the action of bacteria, is not the source of the specific action found in this case, since the effect remains the same even after the filtrate has been buffered.

The bacterial products obtainable by the invention correspond with the substances which are produced in the disease arising from the corresponding bacteria in the animal or human organism. This can be practically useful for immunising living beings. As compared with other methods of obtaining bacterial products, the invention has a considerable advantage in that it does not involve the production of undesired toxic products as is the case when using substances foreign to the body as additions to the nutrient media.

The bacteria cultivated by this invention with varied composition of the nutrient medium develop in the animal diseases that run various courses. It is thus possible to obtain in this manner bacteria which possess properties producing specifically differentiated diseases. This is of especial importance in the production of specific vaccines and immunising preparations. The bacteria cultivated in this manner may be further inoculated on the same nutrient media.

The following examples illustrate the invention:

Example 1

Bacteria, for instance staphylococci, are cultivated on plasma obtained under sterile conditions in suitable flat glass dishes for 4-6 days. The coagulum is by then in part liquified. The bacteria are then separated as quickly as possible from the liquid by centrifuging and/or by means of Seitz-filters, Berkefeld-candles or other filters for removing bacteria, and sterility is tested. The bright yellow clear filtrate has the specific properties. It collects the white blood corpuscles and can thus serve for preventing an infection with bacteria. The bacteria may find use in the manner described in this specification.

In a similar way the rest of the products produced in the process may be obtained which possess differently biologically interesting properties according to the kind of bacterium and organ-extract used.

Example 2

Streptococci, the virulence of which on mice and rabbits has been tested, are cultivated with several inoculations, each 6-8 days long, on plasma nutrient medium. After this time the virulence is tested again. The test shows that, in relation to mice, this virulence is fully maintained but that in relation to rabbits it has suffered an increase in that it produces acute fatal diseases when largely diluted, whereas before the cultivation only chronic illnesses are produced.

Example 3

After 30-40 days cultivation of streptococci on plasma nutrient medium the liquid from the medium is filtered under sterile conditions. With this filtrate mice were pretreated for 4-5 days and later treated with highly virulent streptococci. The animals which had been pretreated once daily with 0.5 cc. of the filtrate were protected by the treatment from the fatal course of the infection, whereas 80–90 per cent of the comparison animals which have not been pretreated died after a few days from the same streptococci infection.

Instead of the streptococci there may of course be used any desired other bacteria for the present process, for example coli- or tubercle-bacilli, pneumococci, gonococci, and others, there being obtained correspondingly specifically differentiated bacterial products or bacteria strains.

What I claim is:

1. A process for the manufacture of bacterial products and bacteria strains, which comprises cultivating bacteria on a nutrient not foreign to the body and consisting of plasma.

2. A process for the manufacture of bacterial products and bacteria strains, which comprises cultivating bacteria on a separable nutrient medium not foreign to the body and consisting essentially of plasma, and removing the bacteria obtained from the separable nutrient medium.

3. A process for the manufacture of bacterial products and bacteria strains, which comprises cultivating streptococci on a separable nutrient medium not foreign to the body and consisting essentially of plasma, and removing the bacteria obtained from the separable nutrient medium.

4. A process for the manufacture of bacterial products containing chemotactic active substances, which comprises cultivating streptococci on a nutrient medium not foreign to the body and consisting essentially of plasma, and filtering the bacteria from the nutrient medium liquid under sterile conditions.

5. The bacterial products and the bacteria strains from plasma cultures of bacteria on a nutrient medium which is not foreign to the body.

6. The bacterial products and the bacteria strains from bacterial cultures on a nutrient medium which is not foreign to the body and consists of plasma.

7. The bacterial products from bacterial cultures on a nutrient medium which is not foreign to the body and consists essentially of plasma.

8. The bacterial products and bacteria strains from streptococci cultures on a nutrient medium which is not foreign to the body and consists essentially of plasma.

ROLF MEIER.